(12) United States Patent
Shimizu et al.

(10) Patent No.: US 7,351,077 B2
(45) Date of Patent: Apr. 1, 2008

(54) ELECTRIC POWER TOOL

(75) Inventors: Hidenori Shimizu, Hikone (JP);
Atsushi Takeyama, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 11/599,984

(22) Filed: Nov. 16, 2006

(65) Prior Publication Data
US 2007/0111591 A1    May 17, 2007

(30) Foreign Application Priority Data
Nov. 17, 2005    (JP) .............................. 2005-333284

(51) Int. Cl.
*H01R 13/62* (2006.01)
(52) U.S. Cl. ...................... 439/155; 439/929
(58) Field of Classification Search ................ 439/500, 439/155, 929, 352
See application file for complete search history.

(56) References Cited
U.S. PATENT DOCUMENTS 6,955,549 B2 * 10/2005 Brazell et al. .............. 439/160
7,160,132 B2 * 1/2007 Phillips et al. .............. 439/341
2004/0192106 A1 * 9/2004 Britz .......................... 439/577
2004/0242042 A1 * 12/2004 Buck et al. .................. 439/160

FOREIGN PATENT DOCUMENTS

EP    1 289 032    8/2002
JP    8 229852    10/1996

* cited by examiner

*Primary Examiner*—Tho D. Ta
(74) *Attorney, Agent, or Firm*—Bacon & Thomas, PLLC

(57) ABSTRACT

An electric power tool includes a main body having a tubular tool body part with an output portion at one end, and a battery pack detachably attached to the main body. The main body also has a grip portion extending from the tool body part radially downwardly. The grip portion has an attachment section formed at a bottom end portion thereof. The attachment section of the main body is provided with an engaged portion, the battery pack is provided at an upper region thereof with an engaging portion for engaging with the engaged portion and at a side region thereof with an operating portion for releasing the engagement of the engaging portion with the engaged portion.

9 Claims, 9 Drawing Sheets

ELECTRIC POWER TOOL

FIELD OF THE INVENTION

The present invention relates to a technique of detachably attaching a battery pack to a main body of an electric power tool.

BACKGROUND OF THE INVENTION

In a conventional structure for attachment of a battery pack to a main body 101 of an electric power tool, as shown in FIG. 9 for example, the battery pack 102 includes manipulation portions 112 and engaging portions 111 at its lateral sides and the main body 101 of the electric power tool is provided with engaged portions 110 at its lateral sides, which are engaged with the corresponding engaging portions 111 of the battery pack 102. The manipulation portions 112 can be pushed inwardly and, by pushing the manipulation portions 112 inwardly, the engaging portions 111 are moved inwardly to be disengaged from the corresponding engaged portions 110 (see, e.g., Japanese Patent Laid-open Application No. H08-229852).

In the meantime, in case a movement stroke of the engaging portion 111 needs to be increased to obtain reliable engagement and disengagement of the engaging portion 11 with the engaged portion 110, it is considered that the distance between the engaging portion 111 and the manipulation portion 112 is set long. In the conventional case described above, if the distance between the engaging portion 111 and the manipulation portion 112 is set long, the vertical length of the battery pack 102 becomes increased in proportion thereto. Recently, there are attempts to reduce the vertical thickness of the battery pack by placing rechargeable cells horizontally. However, in case the structure shown in FIG. 9 is employed for attachment of the battery pack to the electric power tool main body, it may hinder efforts to reduce the vertical thickness of the battery pack.

SUMMARY OF THE INVENTION

It is, therefore, an object of the present invention to provide an electric power tool capable of keeping the vertical dimension of a battery pack small so as not to hinder efforts to reduce the vertical thickness of the battery pack even when a movement stroke of an engaging portion is increased.

In accordance with an aspect of the present invention, there is provided an electric power tool including: a main body including a tubular tool body part with an output portion at one end, the tool body part having therein a motor for driving the output portion, and a grip portion extending from the tool body part in a direction intersecting an axial direction of the tool body part, the grip portion having an attachment section formed at a bottom end portion thereof; and a battery pack detachably attached to the main body, wherein the attachment section of the main body is provided with an engaged portion, the battery pack is provided at an upper region thereof with an engaging portion for engaging with the engaged portion and at a side region thereof with an operating portion for releasing the engagement of the engaging portion with the engaged portion.

With such arrangements, inasmuch as the operating portion and the engaging portion are respectively arranged at the side region and the upper region of the battery pack, the arrangement position of the engaging portion provided at the upper region of the battery pack can be set distant from the operating portion in a front-rear direction in case the distance between the operating portion and the engaging portion needs to be set long so as to increase the movement stroke of the engaging portion for the purpose of obtaining reliable engagement and disengagement of the engaging portion with the engaged portion. In other words, there is no need to set the operating portion distant from the engaging portion in the downward direction, and a desired movement stroke of the engaging portion can be attained regardless of the vertical length of the battery pack.

Preferably, in the electric power tool described above, a manipulation member having the operating portion is disposed at the side region of the battery pack, a coupling member having the engaging portion is arranged at the upper region of the battery pack in such a manner as to allow the engaging portion to move in an upward-downward direction, and a motion conversion part for converting a push-in motion of the operating portion toward an inside of the battery pack to a descending motion of the engaging portion for disengagement from the engaged portion is provided between the manipulation member and the coupling member. In this way, the engaging portion can be moved downwardly to disengage from the engaged portion by pushing the operating portion toward the inside of the battery pack. This makes it possible to provide an improved operation performance.

Further, it is preferable that the manipulation member is pivotally supported at the side region of the battery pack, the coupling member is pivotally supported at the upper region of the battery pack, and the motion conversion part includes a pushed portion provided at a base end of the coupling member and a pushing portion provided at a top end of the manipulation member for pushing the pushed portion in an upward direction. With such arrangements, by pushing the operating portion toward the inside of the battery pack, the engaging portion can be moved downwardly to disengage from the engaged portion with a simpler structure. This makes it possible to provide an improved operation performance.

Further, the coupling member may include a plurality of branch portions; the engaging portion may be formed at an leading end of each of the branch portions of the coupling member, the engaging portions being arranged at opposite lateral sides of a top surface of the battery pack; and the engaged portion may be provided at the main body to correspond to the engaging portions, the engaging portions being adapted to releasably engage with the corresponding engaged portions. With such arrangements, the battery pack can be firmly attached to the main body in a well-balanced manner. Further, since the engagement or disengagement operations of the plural engaging portions with respect to the corresponding engaged portions can be simultaneously performed by the operation of the single operating portion, it is possible to obtain an improved operation performance and to accomplish reduction in size of the structure for attachment of the battery pack to the main body compared with a conventional case where a separate operating portion is provided for each engaging portion.

BRIEF DESCRIPTION OF THE DRAWINGS

The above and other objects and features of the present invention will become apparent from the following description of preferred embodiments, given in conjunction with the accompanying drawings, in which:

FIGS. 5A and 5B are side views for partially showing a coupling member and a manipulation member, wherein FIG. 5A illustrates an operating portion in a non-operated condition and FIG. 5B depicts the operating portion in an operated condition;

DETAILED DESCRIPTION OF THE PREFERRED EMBODIMENTS

Hereinafter, a preferred embodiment of the present invention will be described in detail with reference to the accompanying drawings.

Figure 4:
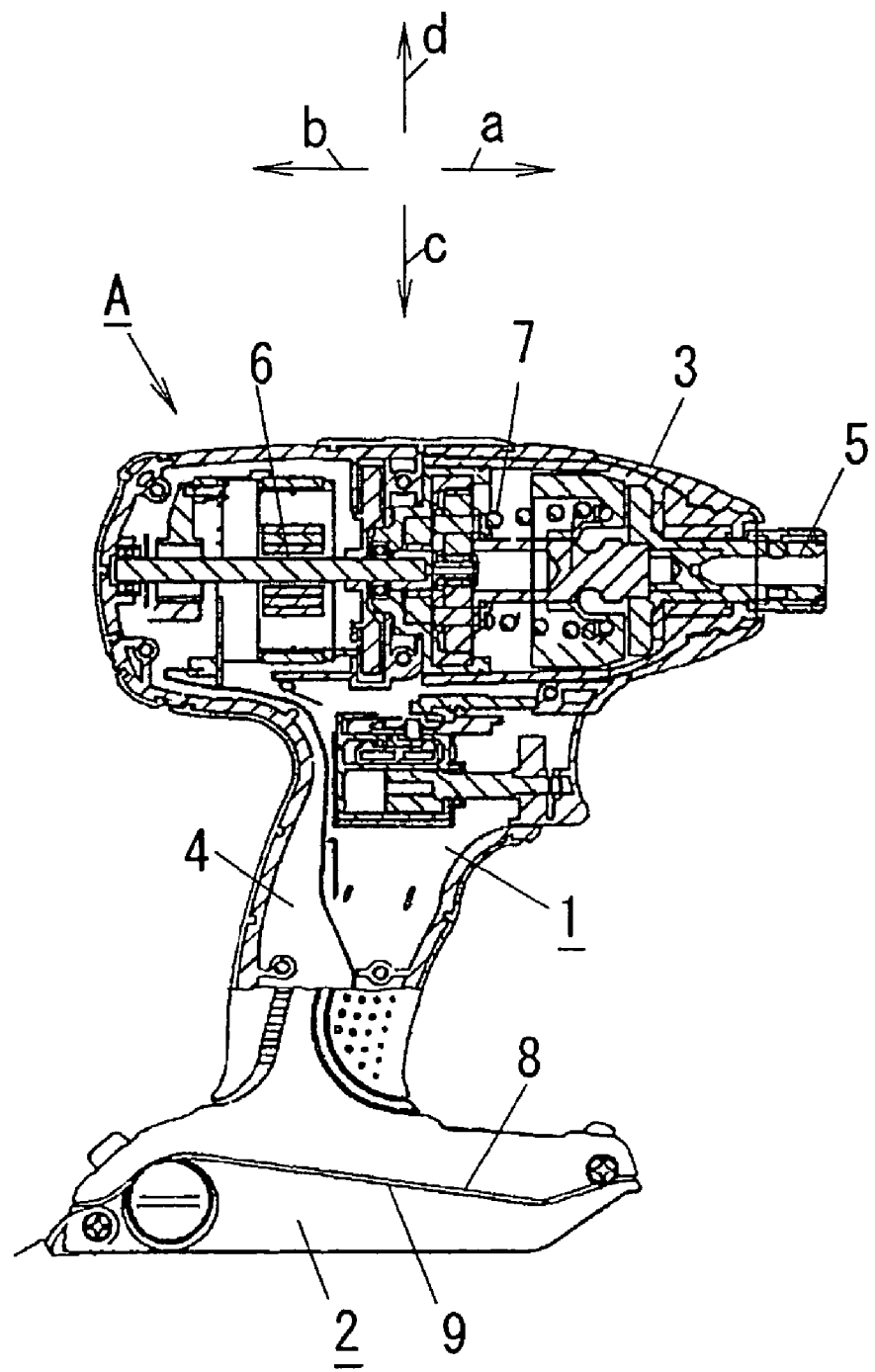
FIG. 4 is a partially cut away side elevational view showing an electric power tool incorporating the battery pack.

As shown in FIG. 4, an electric power tool A, e.g., an impact driver, of the present embodiment includes a battery pack 2 detachably attached to a main body 1 of the electric power tool A. The main body 1 includes a tubular tool body part 3 having a motor 6 driven by an electric power from the battery pack 2, a reduction portion 7 for converting an output of the motor 6 to a reduced output for a tool piece, and an output portion 5 through which the output for a tool piece is outputted. The main body 1 also includes a grip part 4 extending radially outwardly (downwardly) from the tool body part 3. A tool piece (not shown) is removably fastened to the output portion 5 such that it extends in an axial direction of the tool body part 3. For the sake of explanation, the extension direction of the tool piece fastened to the tool body part 3 will be referred to as a "front direction" (arrow "a"), while the opposite direction thereto will be referred to as a "rear direction" (arrow "b"). The extension direction of the grip part 4 from the tool body part 3 will be referred to as a "downward direction" (arrow "c"), while the opposite direction thereto will be referred to as an "upward direction" (arrow "d"). The direction orthogonal to both the upward-downward direction and the front-rear direction will be referred to as a "left-right direction (arrow "e" in FIG. 1).

Figure 6:
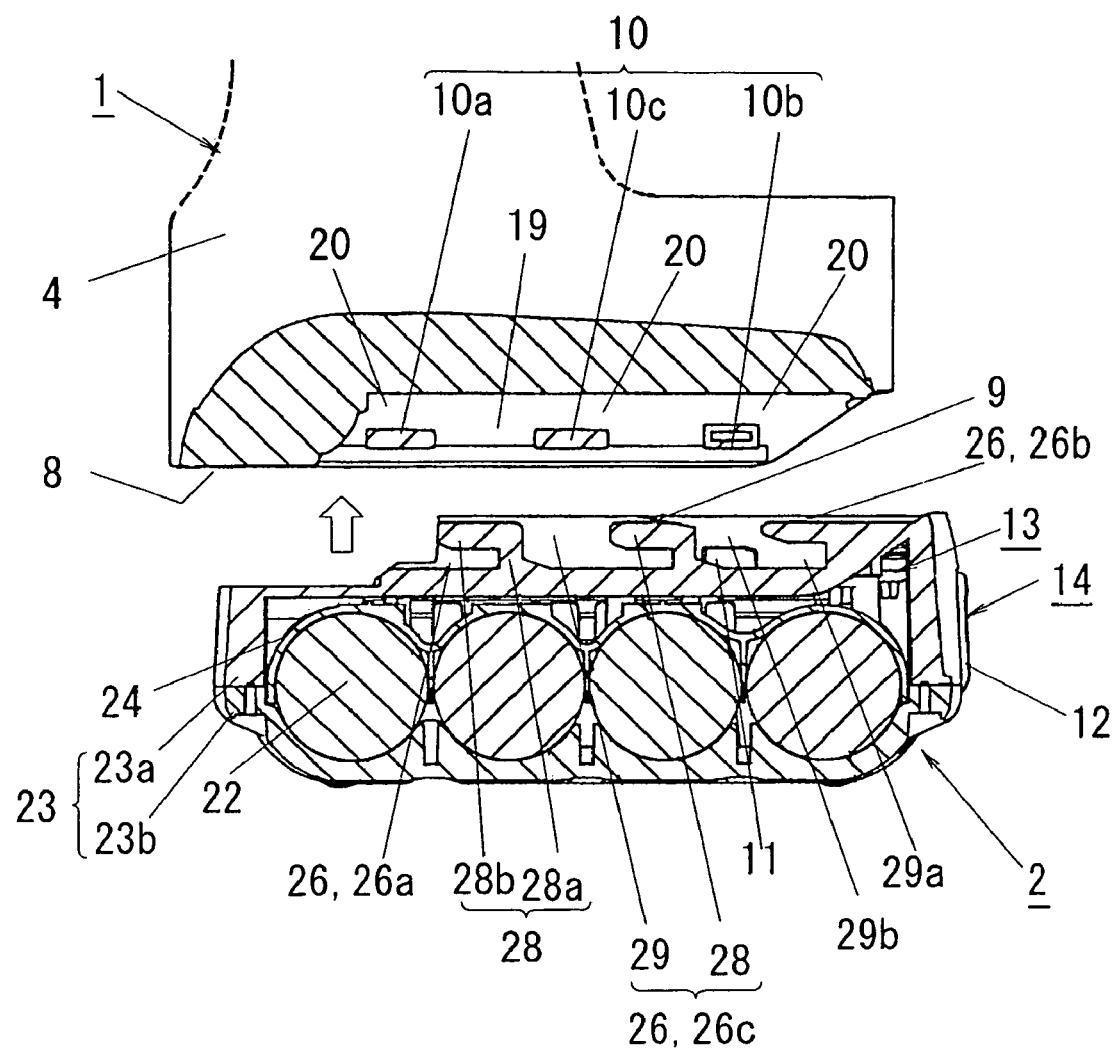
FIGS. 6 to 8 are explanatory cross sectional views for explaining a manner of attaching the battery pack to a main body of the electric power tool.

An attachment section 8 to which the battery pack 2 is attached is provided at a bottom end portion of the grip part 4. As illustrated in FIG. 6, a recessed portion 19 opened both in the downward direction and in the front direction is formed in the attachment section 8 of the main body 1. A power feeding terminal (not shown) is provided on a ceiling surface of the recessed portion 19. At lower positions on left and right inner surfaces of the recessed portion 19, engaged portions 10 of a horizontally-extending plate shape are provided so as to protrude inwardly in a bilaterally symmetrical relationship. Retaining groove portions 20, i.e., spaces for receiving attachment-retaining portions 28b to be described later are formed between the top surfaces of the engaged portions 10 and the ceiling surface of the recessed portion 19. In the illustrated embodiment, there are provided at each lateral side three engaged portions 10 which are arranged in the front-rear direction. For the sake of convenience, the rearmost engaged portion 10 will be referred to as a "rear engaged portion 10a", the frontmost engaged portion 10 will be referred to as a "front engaged portion 10b", and the engaged portion 10 lying between the rear engaged portion 10a and the front engaged portion 10b will be referred to as a "middle engaged portion 10c".

Figure 1:
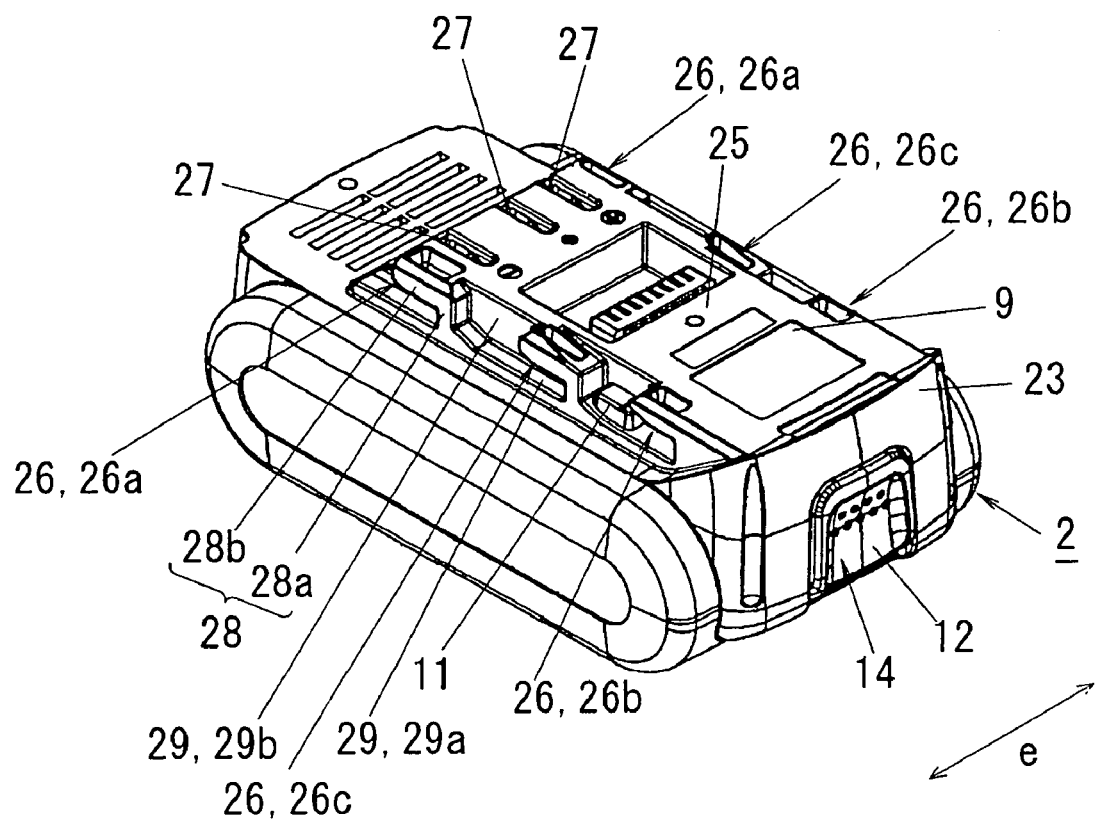
FIG. 1 is a perspective view showing a battery pack in accordance with a preferred embodiment of the present invention.
Figure 2:
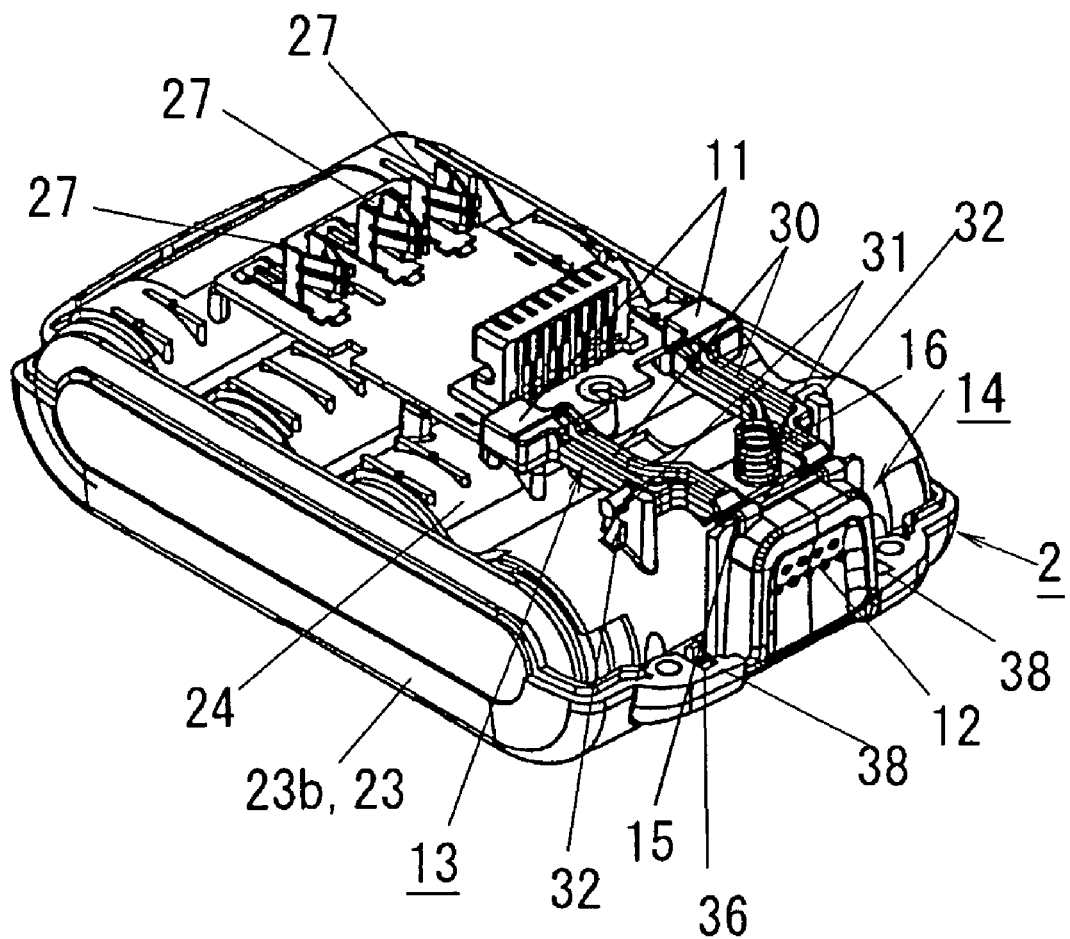
FIG. 2 is a perspective view of the battery pack shown in FIG. 1, with an outer cover thereof removed.
Figure 3:
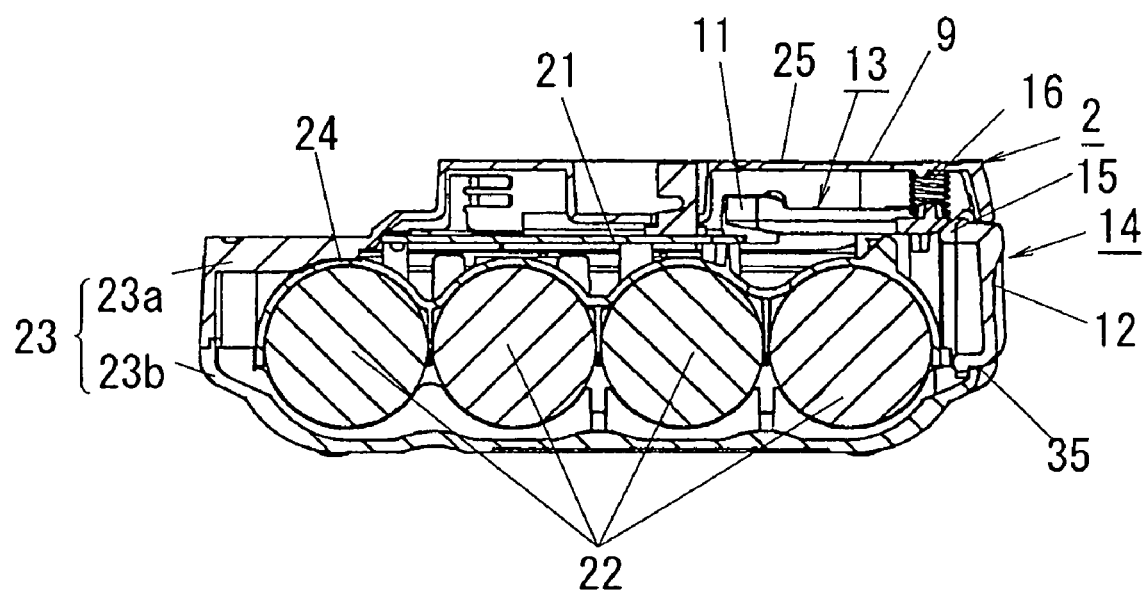
FIG. 3 is a cross sectional view of the battery pack shown in FIG. 1.

As shown in FIGS. 1 to 3, the battery pack 2 is provided at its top with an attachment portion 9 to be attached to the attachment section 8 of the main body 1. The battery pack 2 has a box-like body storing therein a plurality of rechargeable cells 22 electrically connected by means of a connecting plate 21. In the illustrated embodiment, the battery pack 2 is of a dual structure wherein an outer case 23 surrounding an inner case 24 of a smaller size covering the rechargeable cells 22. In this regard, lithium-ion cells are used as the rechargeable cells 22 of the present embodiment. The rechargeable cells 22 are accommodated in such a manner that they are laid to extend in the left-right direction and arranged side by side in the front-rear direction. That is to say, the battery pack 2 is formed into a flat external shape with a reduced vertical size and increased horizontal dimensions. The outer case 23 is of a substantially rectangular shape (having long sides in the front-rear direction and short sides in the left-right direction) when viewed from above and is formed by assembling two upper and lower halves, i.e., an upper case portion 23a and a lower case portion 23b together.

The attachment portion 9 includes an attachment platform portion 25 attachable to both an attachment section of a battery charger (not shown) and the attachment section 8 of the electric power tool main body 1, and locking portions 26 interlocked with the engaged portions 10 of the electric power tool main body 1. The attachment platform portion 25 is a stage-like region protruding upwardly from the top surface of the battery pack 2, with left and right edge regions and a rear edge region left intact. Provided on a top surface of the attachment platform portion 25 are terminal portions 27 that make electrical contact with terminal portions of the electric power tool main body 1 or terminal portions of the battery charger. The locking portions 26 are provided on both left and right sides (left and right lateral portions) of the attachment platform portion 25 in a spaced-apart relationship in the front-rear direction. In the illustrated embodiment, the locking portions 26 are provided at three spots per one side in a bilaterally symmetrical relationship, and hence at six spots in total.

Each of the locking portions 26 includes an inverted "L"-shaped hook 28 formed on the upper case portion 23a and an "L"-shaped space 29 formed at the rear side of the inverted "L"-shaped hook 28. The inverted "L"-shaped hook 28 has an insertion-restricting portion 28a extending upright from the top surface of the battery pack 2 and an attachment-retaining portion 28b extending in the rear direction from the top end of the insertion-restricting portion 28a. The "L"-shaped space 29 consists of a horizontal recess 29a provided between the attachment-retaining portion 28b and the top surface of the battery pack 2 and a vertical recess 29b opened upwardly and communicating with the horizontal recess 29a. For the sake of convenience, among the three locking portions 26 arranged in the front-rear direction, the rearmost one will be referred to as a "rear locking portion 26a", the frontmost one will be referred to as a "front locking portion 26b", and the intermediate one between the rear locking portion 26a and the front locking portion 26b will be referred to as a "middle locking portion 26c". In case of the "L"-shaped space 29 of the rear locking portion 26a, the vertical recess 29b is opened rearwardly as well as upwardly.

Figure 5A:
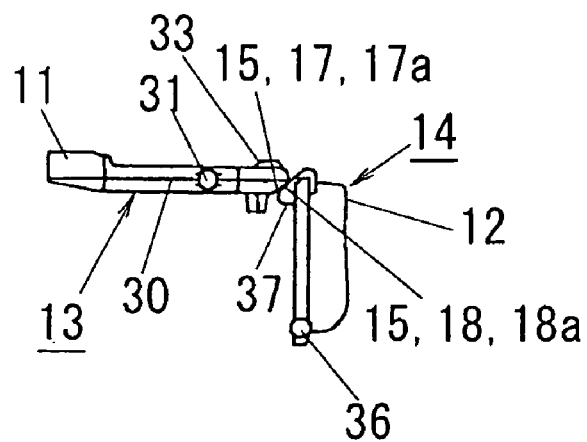
Figure 5B:
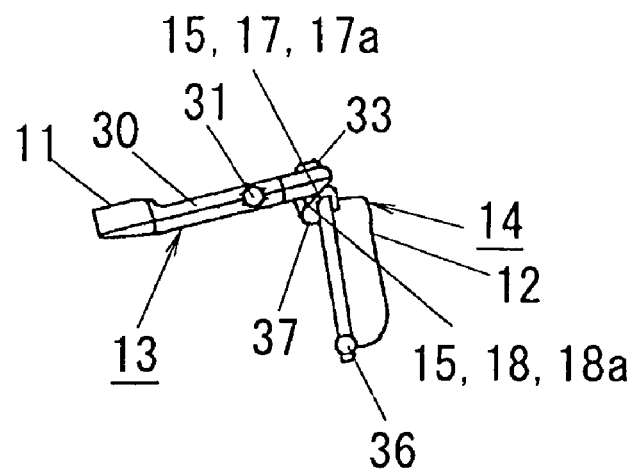

An engaging portion 11 is disposed in a vertically movable condition at a lower area of the vertical recess 29b of each of the left and right front locking portions 26b (above the top surface of the battery pack 2). The engaging portion 11 is a functional portion releasably engaging with the front engaged portion 10b. The movement of the engaging portion 11 is made by means of a linkage mechanism including a coupling member 13 with the engaging portion 11 and a manipulation member 14 with an operating portion 12, as can be seen in FIGS. 5A and 5B. Referring to FIG. 3, the coupling member 13 and the manipulation member 14 are disposed in a hollow space between the outer case 23 and the inner case 24. Specifically, the coupling member 13 is generally horizontally disposed within the hollow space between a downwardly-facing top inner surface of the outer case 23 and a top surface of the inner case 24. The manipulation member 14 is generally vertically disposed within the hollow space between a rearwardly-facing front inner surface of the outer case 23 and a front surface of the inner case 24.

The coupling member 13 is arranged at an upper region of the battery pack 2 such that a base end and a leading end thereof are positioned at a front side and a rear side of the battery pack 2, respectively. Branch portions 30 divided into two branches extend from the base end toward the leading end of the coupling member 13. The engaging portion 11 protrudes upwardly from each leading end of the branch portions 30 constituting the leading end of the coupling member 13. Pivot shafts 31 are provided at positions of the respective branch portions 30 near the base end thereof in such a manner as to protrude outwardly in the left-right direction. The pivot shafts 31 are pivotally supported by bearing portions 32 provided at left and right upper positions of the outer case 23. A boss-like resilient member holding portion 33 is provided on a top surface of the base end of the coupling member 13, and a resilient member 16 formed of, e.g., a compression coil spring is fitted onto the resilient member holding portion 33. The resilient member 16 is brought into resilient contact with a ceiling surface of the outer case 23 at its top end. Namely, the resilient member 16 is interposed between the base end of the coupling member 13 and the ceiling surface of the outer case 23. In this way, the coupling member 13 is arranged at the upper region of the battery pack 2 with the base end thereof spring-biased downwardly by the resilient member 16, so that the coupling member 13 can be pivoted in the upward-downward direction through the pivot mechanism in which the pivot shafts 31 are pivotally supported by the respective bearing portions 32. The engaging portion 11 provided at the leading end of the coupling member 13 is spring-biased such that it can project upwardly from the bottom of the vertical recess 29b of each of the left and right front locking portions 26b, through a corresponding hole 34 formed at the bottom of the vertical recess 29b of each of the front locking portions 26b (in the top surface of the upper case portion 23a). At the base end of the coupling member 13, there is provided a pushed portion 17 mating with a pushing portion 18 of the manipulation member 14. The pushed portion 17 cooperates with the pushing portion 18 of the manipulation member 14 to form a motion conversion part 15 through which a push-in motion of the operating portion 12 toward the inside of the battery pack 2 is converted to a descending motion of the engaging portion 11 for disengagement from the engaged portion 10. In the illustrated embodiment, the pushed portion 17 includes a frontwardly downwardly facing inclined contact surface 17a.

The operating portion 12 of the manipulation member 14 is exposed to the front side of the battery pack 2 through an operating portion penetration hole 35 formed in the front surface of the outer case 23. The pushing portion 18 is formed on the top end of the manipulation member 14. Pivot shafts 36 are formed at the bottom end portion of the manipulation member 14 such that they protrude outwardly in the left-right direction. The pushing portion 18 serves as the motion conversion part 15 in cooperation with the pushed portion 17 of the coupling member 13. In the illustrated embodiment, the pushing portion 18 includes a rearwardly upwardly facing contact surface 18a provided on a lug portion 37 that protrudes rearwardly from the top end of the manipulation member 14. Bearing portions 38, by which the respective pivot shafts 36 are pivotally supported, are formed at the bottom end regions of left and right edges of the operating portion penetration hole 35 of the outer case 23. In this way, the manipulation member 14 is arranged at the front side region of the battery pack 2 with the contact surface 18a on the top end thereof kept in contact with the contact surface 17a of the coupling member 13, and the manipulation member 14 can be pivoted in the front-rear direction through the pivot mechanism in which the pivot shafts 36 are pivotally supported by the bearing portions 38. If the operating portion 12 is pushed rearwardly by an operator's finger, the manipulation member 14 rotates about the pivot shafts 36 and moves in the rear direction, as shown in FIG. 5B (from the state of FIG. 5A). At this moment, the contact surface 18a of the manipulation member 14 rotatably moving in the rear direction contacts with the contact surface 17a of the coupling member 13 and pushes the coupling member 13 upwardly against the spring force of the resilient member 16. In response, the leading end (leading end portion) of the coupling member 13 is rotated downwardly about the pivot shafts 31. Thus, the engaging portions 11 formed at the leading end of the coupling member 13 are moved downwardly such that they are retracted in the bottom of the corresponding vertical recesses 29b of the front locking portions 26b (in the top surface of the upper case portion 23a).

Figure 7:
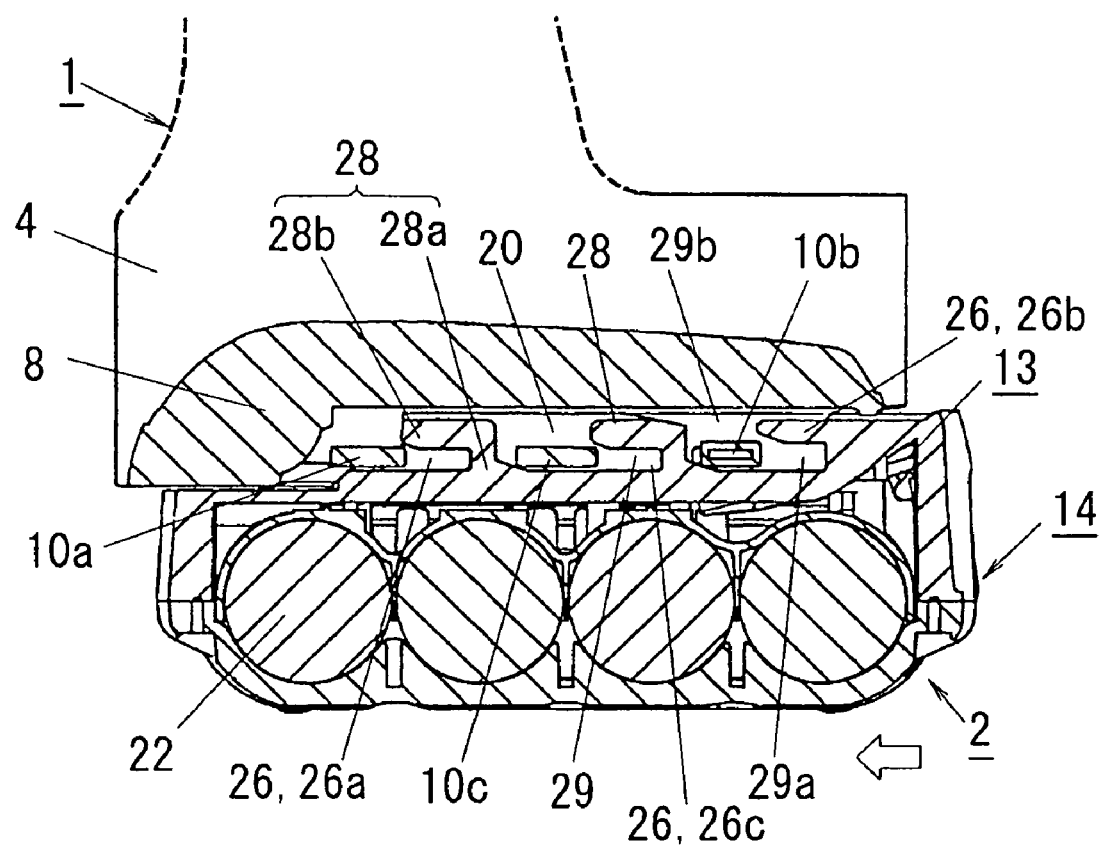
Figure 8:
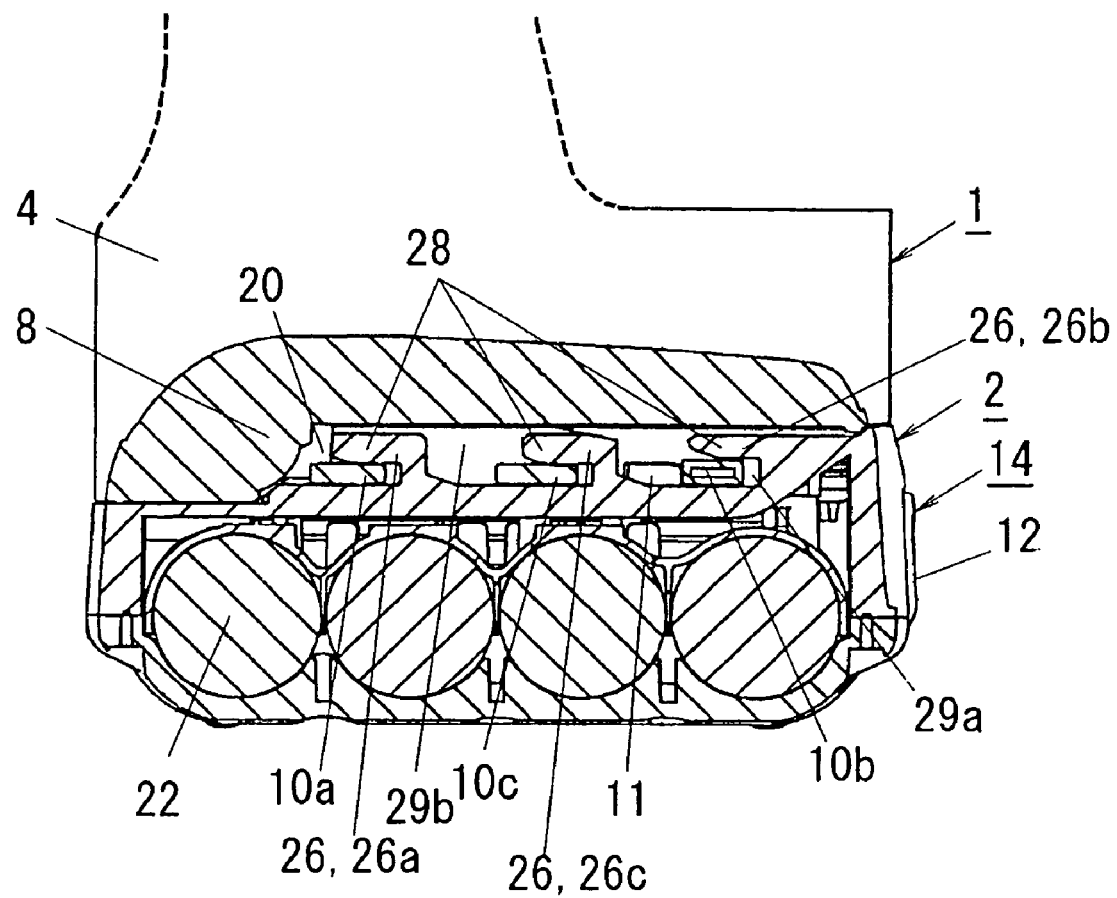

In order to attach the battery pack 2 to the electric power tool main body 1, the attachment portion 9 of the battery pack 2 is made to approach the attachment section 8 of the electric power tool main body 1 from below as illustrated in FIG. 6. Then, the engaged portions 10 of the electric power tool main body 1 are inserted into the corresponding vertical recesses 29b of the locking portions 26 of the battery pack 2, as depicted in FIG. 7. In this process, the front engaged portions 10b push down the corresponding engaging portions 11 protruding into the respective vertical recesses 29b of the front locking portions 26b, so that the engaging portions 11 become retracted in the bottom of the corresponding vertical recesses 29b. In this condition, as illustrated in FIG. 8, the battery pack 2 is displaced in the rear direction with respect to the electric power tool main body 1 so that the engaged portions 10 are fitted into the corresponding horizontal recesses 29a with the attachment-retaining portions 28b of the inverted "L"-shaped hooks 28 inserted into the corresponding retaining groove portions 20. As the engaged portions 10 are moved from the vertical recesses 29b to the horizontal recesses 29a, the engaging portions 11 are released from the respective front engaged portions 10b pushing them down and, under the action of the resilient member 16, return to their original positions (in which the engaging portions 11 protrude upwardly from the bottom of the vertical recesses 29b). When inserted into the horizontal recesses 29a, each of the front engaged portions 10b is engaged with the engaging portion 11 in a removal-prevention state (specifically, in such a state that the front engaged portion 10b inserted into the horizontal recess 29a is sandwichedly held in the front-rear direction between the engaging portion 11 and the insertion-restraining portion 28a and in the upward-downward direction between the top surface of the battery pack 2 and the attachment-retaining portion 28b). In this way, the battery pack 2 is attached to the electric power tool main body 1.

On the other hand, in case the battery pack 2 is detached from the electric power tool main body 1, the detachment of the battery pack 2 from the electric power tool main body 1 is carried out in the following order. First, the operating portion 12 of the manipulation member 14 is pushed rearwardly by use of an operator's finger as illustrated in FIG. 5A such that the engaging portions 11 of the coupling member 13 are retracted in the bottom of the corresponding vertical recesses 29b of the front locking portions 26b. Thus, the engaging portions 11 are released from the engagement with the corresponding front engaged portions 10b (i.e., from the removal-prevention state wherein the engaging portions 11 are prevented from being released from the corresponding horizontal recesses 29a of the front engaged portions 10b). In this state, the battery pack 2 is displaced frontwardly with respect to the electric power tool main body 1 to ensure that the engaged portions 10 are removed from the corresponding horizontal recesses 29a with the attachment-retaining portions 28b of the inverted "L"-shaped hooks 28 separated from the corresponding retaining groove portions 20 (the state depicted in FIG. 7). Then, the battery pack 2 is made to move downwardly away from the electric power tool main body 1, thereby allowing the engaged portions 10 to be removed upwardly through the top openings of the corresponding vertical recesses 29b (the state shown in FIG. 6).

In accordance with the electric power tool of the present embodiment having the afore-mentioned structure for attachment of the battery pack 2 to the electric power tool main body 1, there are provided the following advantages.

First, inasmuch as the operating portion 12 and the engaging portion 11 are respectively arranged at the side region and the upper region of the battery pack 2, the arrangement position of the engaging portion 11 provided at the upper region of the battery pack 2 can be set distant from the operating portion 12 in the front-rear direction in case the distance between the operating portion 12 and the engaging portion 11 needs to be set long so as to increase the movement stroke of the engaging portion 11 for the purpose of obtaining reliable engagement and disengagement of the engaging portion 11 with the engaged portion 10. In other words, there is no need to set the operating portion 12 distant from the engaging portion 11 in the downward direction, and a desired movement stroke of the engaging portion 11 can be attained regardless of the vertical length of the battery pack 2. This helps to keep short the vertical length of the battery pack 2. In a nutshell, the battery pack 2 of the present embodiment seeks to reduce the vertical thickness by placing the rechargeable cells 22 horizontally and, as set forth above, employs a structure for attachment of the battery pack 2 to the electric power tool main body 1 that can keep short the vertical length of the battery pack 2 even when the movement stroke of the engaging portion 11 is set greater. Thus, the electric power tool of the present invention does not hinder the reduction of the vertical thickness of the battery pack 2.

The structure of the operating portion 12 and the engaging portion 11 arranged at the side region and the upper region of the battery pack 2 may be obtained by integrally forming the operating portion 12 and the engaging portion 11 into an "L"-shaped member, as mentioned above. In this case, in order to displace the engaging portion 11 downwardly to disengage from the engaged portion 10, the operating portion 12 needs to be pulled outwardly, resulting in a poor operability. In the structure of the present embodiment for attachment of the battery pack 2 to the electric power tool main body 1, however, the manipulation member 14 having the integrally formed operating portion 12 and the coupling member 13 having the integrally formed coupling portion 11 are employed as separate and discrete bodies. Furthermore, between the operating member 14 and the coupling member 13, there is provided the motion conversion part 15 by which a push-in motion of the operating portion 12 toward the inside of the battery pack 2 is converted to a descending motion of the engaging portion 11 for disengagement from the engaged portion 10. As a result, the engaging portion 11 can be moved downwardly to disengage from the engaged portion 10 by inwardly pushing the operating portion 12. Namely, a great movement stroke of the engaging portion 11 can be obtained with a short stroke of the operating portion 12. This makes it possible to provide an improved operation performance.

Moreover, in the structure of the present embodiment for attachment of the battery pack 2 to the electric power tool main body 1, the bottom end portion of the manipulation member 14 having the integrally formed operating portion 12 is pivotally supported at the front side of the battery pack 2. The coupling member 13 having the integrally formed engaging portion 11 at its leading end is pivotally supported at a position near the base end thereof by the battery pack 2 and is disposed at the upper region of the battery pack 2. The motion conversion part 15 is formed by bringing the pushing portion 18 provided at the top end of the manipulation member 14 into contact with the pushed portion 17 provided at the base end of the coupling member 13. This ensures that, in response to the pushing operation of the operating portion 12, the manipulation member 14 is pivoted (rotated) about the bottom end portion thereof, thereby obtaining a maximum operation stroke at the top end thereof. By effectively taking advantage of the maximum operation stroke, the pushing portion 18 formed at the top end of the manipulation member 14 is made to contact with the pushed portion 17 formed at the base end of the coupling member 13 and push the base end of the coupling member 13 in the upward direction. In response, the coupling member 13 is pivoted (rotated) about the pivot position near the base end thereof, whereby the engaging portion 11 formed at the leading end of the coupling member 13 can be moved with a stroke great enough to assure reliable engagement and disengagement of the engaging portion 11 with the engaged portion 10. In this point of view, it is possible to obtain an improved operation performance.

Moreover, in the state that the battery pack 2 is attached to the electric power tool main body 1, the locking portions 26 of the battery pack 2 are interlocked with the corresponding engaged portions 10 of the electric power tool main body 1 (specifically, the engaged portions 10 are inserted into the corresponding horizontal recesses 29a, while the attachment-retaining portions 28b of the inverted "L"-shaped hooks 28 are inserted into the corresponding retaining groove portions 20). In addition, the engaging portions 11 engage with the corresponding engaged portions 10, thus keeping the front locking portions 26*b* against removal from the corresponding horizontal recesses 29*a*. This ensures that the battery pack 2 is attached to the electric power tool main body 1 in a firmly coupled condition. Even if the engaging portions 11 are disengaged from the corresponding engaged portions 10 by an inadvertent operation of the operating portion 12, the locking portions 26 remain interlocked with the corresponding engaged portions 10. Thus, it is possible to avoid such a situation that, at the time of inadvertent operation of the operating portion 12, the battery pack 2 is dropped immediately from the electric power tool main body 1 by its own weight.

Furthermore, the attachment portion 9 of the battery pack 2 is attached to the attachment section 8 of the electric power tool main body 1 at the opposite sides of the terminal portion 27 by allowing the locking portions 26 to interlock with the corresponding engaged portions 10 and also by causing the engaging portions 11 to engage with the corresponding engaged portions 10. Accordingly, the battery pack 2 is firmly attached to the electric power tool main body 1 in a well-balanced manner, while assuring reliable electrical connection between the corresponding terminal portions 27 of the battery pack 2 and the electric power tool main body 1.

Figure 9:
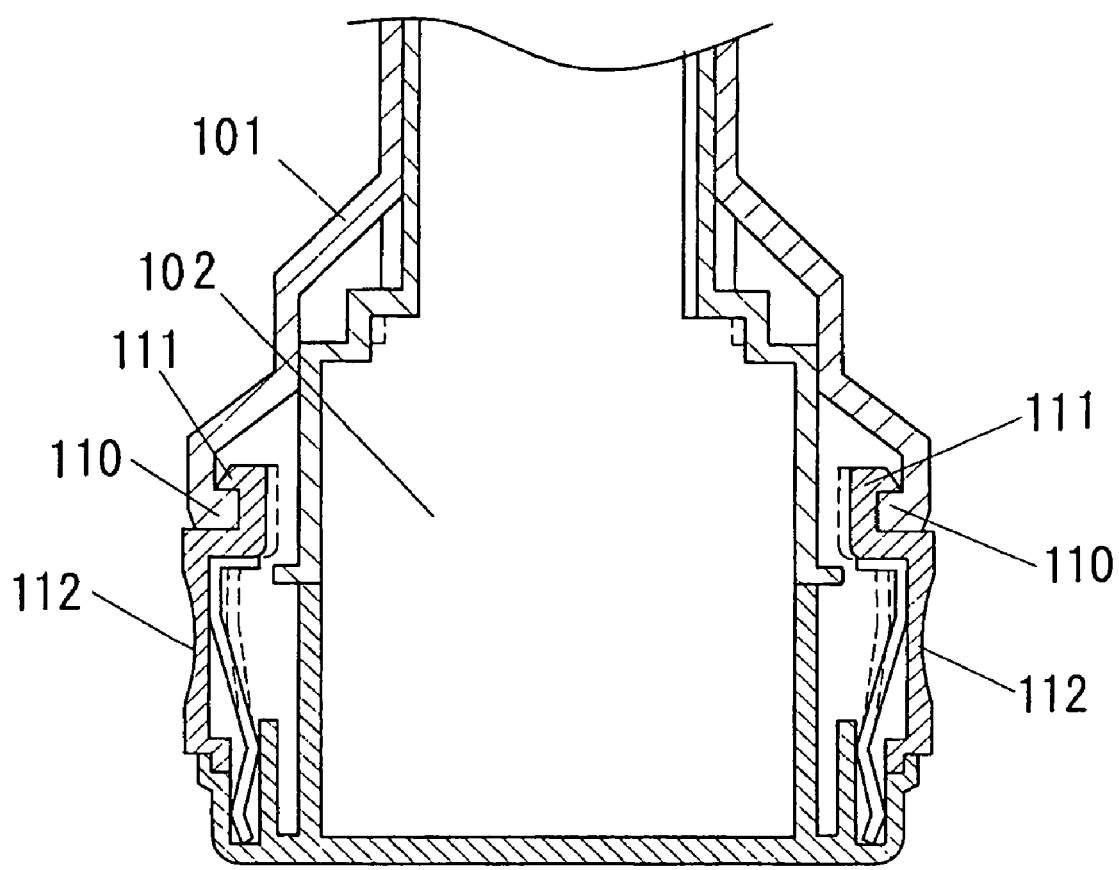
FIG. 9 is a cross sectional view showing major parts of a conventional electric power tool.

Additionally, in the present embodiment, the engaging portions 11 are provided at opposite lateral sides of the attachment portion 9, the engaging portions 11 being formed at the respective leading ends of the branch portions 30 of the coupling member 13, so that the engagement or disengagement operations of the two engaging portions 11 with respect to the corresponding engaged portions 10 can be simultaneously performed by the operation of the single operating portion 12. Conventionally, it is typical that the operating portion 12 is provided in a one-to-one correspondence relationship with the engaging portions 11. This holds true for the prior art electric power tool shown in FIG. 9. Thus, not only the operability is poor but also the structure for attachment of the battery pack 2 to the electric power tool main body 1 increases in size. In the present embodiment, however, thanks to the fact that the engagement or disengagement operations of the two engaging portions 11 with respect to the corresponding engaged portions 10 can be simultaneously performed by the operation of the single operating portion 12, it is possible to obtain an improved operation performance and to accomplish reduction in size of the structure for attachment of the battery pack 2 to the electric power tool main body 1.

Although both the manipulation member 14 and the coupling member 13 are pivotally supported by the battery pack 2 in the foregoing embodiment, the manipulation member 14 may be arranged, e.g., in such a manner as to slide inwardly and outwardly (in the front-rear direction), which exhibits the same effects as those in the foregoing embodiment.

While the present invention has been described with respect to the particular embodiments, it will be apparent to those skilled in the art that various changes and modifications may be made without departing from the scope of the invention as defined in the following claims.

What is claimed is:

1. An electric power tool comprising:
    a main body including a tubular tool body part with an output portion at one end, the tool body part having therein a motor for driving the output portion, and a grip portion extending from the tool body part in a direction intersecting an axial direction of the tool body part, the grip portion having an attachment section formed at a bottom end portion thereof; and
    a battery pack having an attachment portion formed at an upper region of the battery pack to be detachably attached to the main body;
    wherein the attachment section of the main body is provided with an engaged portion; and
    wherein the attachment portion of the battery pack includes a locking portion for interlocking with the engaged portion when the engaged portion is inserted under the locking portion; and an engaging portion for engaging with the engaged portion interlocked with the locking portion to thereby prevent the engaged portion from being moved away from the locking portion; and
    wherein the battery pack is provided with, at a side region thereof, with an operating portion for releasing the engagement of the engaging portion with the engaged portion to thereby allow the engaged portion to be moved away from the locking portion.

2. The electric power tool of claim 1, wherein a manipulation member having the operating portion is disposed at the side region of the battery pack; a coupling member having the engaging portion is arranged at the upper region of the battery pack in such a manner as to allow the engaging portion to move in an upward-downward direction; and a motion conversion part for converting a push-in motion of the operating portion toward an inside of the battery pack to a descending motion of the engaging portion for disengagement from the engaged portion is provided between the manipulation member and the coupling member.

3. The electric power tool of claim 2, wherein the coupling member is arranged such that a base end and a leading end of the coupling member are positioned at a front side and a rear side of the battery pack, respectively, and the engaging portion is disposed at the leading end of the coupling member.

4. The electric power tool of claim 2, wherein the manipulation member is pivotally supported at the side region of the battery pack, the coupling member is pivotally supported at the upper region of the battery pack, and the motion conversion part includes a pushed portion provided at the base end of the coupling member and a pushing portion provided at a top end of the manipulation member for pushing the pushed portion in an upward direction.

5. The electric power tool of claim 2, wherein the coupling member is provided with a plurality of branch portions; the engaging portion is formed at the leading end of each of the branch portions of the coupling member, the engaging portions being arranged at opposite lateral sides of a top surface of the battery pack; and the engaged portion is provided at the main body to correspond to the engaging portions, the engaging portions being adapted to releasably engage with the corresponding engaged portions.

6. An electric power tool comprising:
    a main body including a tubular tool body part with an output portion at one end, the tool body part having therein a motor for driving the output portion, and a grip portion extending from the tool body part in a direction intersecting an axial direction of the tool body part, the grip portion having an attachment section formed at a bottom end portion thereof; and
    a battery pack detachably attached to the main body,
    wherein the attachment section of the main body is provided with an engaged portion; and
    wherein the battery pack is provided, at an upper region thereof, with an engaging portion for engaging with the engaged portion; and, at a side region thereof, with an operating portion for releasing the engagement of the engaging portion with the engaged portion; and wherein a manipulation member having the operating portion is disposed at the side region of the battery pack, a coupling member having the engaging portion is arranged at the upper region of the battery pack in such a manner as to allow the engaging portion to move in an upward-downward direction, and a motion conversion part for converting a push-in motion of the operating portion toward an inside of the battery pack to a descending motion of the engaging portion for disengagement from the engaged portion is provided between the manipulation member and the coupling member; and wherein the manipulation member is pivotally supported at the side region of the battery pack, the coupling member is pivotally supported at the upper region of the battery pack, and the motion conversion part includes a pushed portion provided at a base end of the coupling member and a pushing portion provided at a top end of the manipulation member for pushing the pushed portion in an upward direction.

7. An electric power tool comprising:

a main body including a tubular tool body part with an output portion at one end, the tool body part having therein a motor for driving the output portion, and a grip portion extending from the tool body part in a direction intersecting an axial direction of the tool body part, the grip portion having an attachment section formed at a bottom end portion thereof; and a battery pack detachably attached to the main body, wherein the attachment section of the main body is provided with an engaged portion; and wherein the battery pack is provided, at an upper region thereof, with an engaging portion for engaging with the engaged portion; and, at a side region thereof, with an operating portion for releasing the engagement of the engaging portion with the engaged portion; and wherein a manipulation member having the operating portion is disposed at the side region of the battery pack, a coupling member having the engaging portion is arranged at the upper region of the battery pack in such a manner as to allow the engaging portion to move in an upward-downward direction, and a motion conversion part for converting a push-in motion of the operating portion toward an inside of the battery pack to a descending motion of the engaging portion for disengagement from the engaged portion is provided between the manipulation member and the coupling member; and wherein the coupling member is provided with a plurality of branch portions; the engaging portion is formed at an leading end of each of the branch portions of the coupling member, the engaging portions being arranged at opposite lateral sides of a top surface of the battery pack; and the engaged portion is provided at the main body to correspond to the engaging portions, the engaging portions being adapted to releasably engage with the corresponding engaged portions.

8. An electric power tool comprising:

a main body including a tubular tool body part with an output portion at one end, the tool body part having therein a motor for driving the output portion, and a grip portion extending from the tool body part in a direction intersecting an axial direction of the tool body part, the grip portion having an attachment section formed at a bottom end portion thereof; and a battery pack detachably attached to the main body, wherein the attachment section of the main body is provided with an engaged portion; and wherein the battery pack is provided, at an upper region thereof, with an engaging portion for engaging with the engaged portion; and, at a side region thereof, with an operating portion for releasing the engagement of the engaging portion with the engaged portion; and wherein a manipulation member having the operating portion is disposed at the side region of the battery pack; a coupling member having the engaging portion is arranged at the upper region of the battery pack in such a manner as to allow the engaging portion to move in an upward-downward direction; and a motion conversion part for converting a push-in motion of the operating portion toward an inside of the battery pack to a descending motion of the engaging portion for disengagement from the engaged portion is provided between the manipulation member and the coupling member; and wherein the coupling member is arranged such that a base end and a leading end of the coupling member are positioned at a front side and a rear side of the battery pack, and the engaging portion is disposed at the leading end of the coupling member.

9. The electric power tool of claim 8, wherein the manipulation member is pivotally supported at the side region of the battery pack, the coupling member is pivotally supported at the upper region of the battery pack, and the motion conversion part includes a pushed portion provided at a base end of the coupling member and a pushing portion provided at a top end of the manipulation member for pushing the pushed portion in an upward direction.

* * * * *